United States Patent
Rao et al.

(10) Patent No.: US 10,772,051 B2
(45) Date of Patent: Sep. 8, 2020

(54) INTER-CELL INTERFERENCE MITIGATION

(71) Applicant: Parallel Wireless, Inc., Nashua, NH (US)

(72) Inventors: Prashanth Rao, Wilmington, MA (US); Yang Cao, Westford, MA (US); Kaitki Agarwal, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/828,432

(22) Filed: Aug. 17, 2015

(65) Prior Publication Data

US 2016/0050577 A1 Feb. 18, 2016

Related U.S. Application Data

(60) Provisional application No. 62/037,982, filed on Aug. 15, 2014.

(51) Int. Cl.
*H04W 52/40* (2009.01)
*H04W 48/18* (2009.01)
(Continued)

(52) U.S. Cl.
CPC .......... *H04W 52/40* (2013.01); *H04W 48/18* (2013.01); *H04W 52/243* (2013.01);
(Continued)

(58) Field of Classification Search
None
See application file for complete search history.

(56) References Cited

U.S. PATENT DOCUMENTS 8,570,888 B1 * 10/2013 Vargantwar ......... H04W 52/241
370/252
8,761,080 B2   6/2014 Mese et al.
(Continued)

FOREIGN PATENT DOCUMENTS

CN    101986586 A    3/2011
CN    102291785 A    12/2011
(Continued)

OTHER PUBLICATIONS

European Telecommunications Standards Institute, ETSI TS 136 331 v10.7.0 (Nov. 2012), "LTE; Evolved Universal Terrestrial Radio Access (E-UTRA); Radio Resource Control (RRC); Protocol Specification," (3GPP TS 36.331 version 10.7.0 Release 10), Nov. 2012 V10.7.0.

(Continued)

*Primary Examiner* — Mohammad S Adhami
(74) *Attorney, Agent, or Firm* — Michael Y. Saji; David W. Rouille

(57) ABSTRACT

To address the problem of inter-cell interference in a heterogeneous network, several methods and systems are disclosed for determining interference caused by an aggressor mobile node, and transmitting at appropriate times and with transmit power that does not cause interference. Methods disclosed include using X2 communications, such as HII and RNTP messages, switching to an alternative radio access technology, sniffing at the eNodeB to obtain information, coordinating with a cloud coordination server, and using CFI information to avoid interfering with communications on the PDCCH.

11 Claims, 3 Drawing Sheets

(51) Int. Cl.
*H04W 52/24* (2009.01)
*H04W 84/12* (2009.01)
*H04W 88/06* (2009.01)
*H04W 36/22* (2009.01)

(52) U.S. Cl.
CPC ............ *H04W 36/22* (2013.01); *H04W 84/12* (2013.01); *H04W 88/06* (2013.01)

(56) References Cited

U.S. PATENT DOCUMENTS

| | | |
|---|---|---|
| 8,909,157 B2 | 12/2014 | Kruglick |
| 9,755,798 B2 | 9/2017 | Centonza et al. |
| 2008/0268833 A1 | 10/2008 | Huang et al. |
| 2010/0110886 A1 | 5/2010 | Sorri et al. |
| 2010/0130194 A1 | 5/2010 | Dickey |
| 2011/0019639 A1* | 1/2011 | Karaoguz ......... H04W 36/0055 370/331 |
| 2011/0255486 A1 | 10/2011 | Luo et al. |
| 2011/0319084 A1 | 12/2011 | Meshkati et al. |
| 2012/0008591 A1 | 1/2012 | Miki et al. |
| 2012/0021753 A1 | 1/2012 | Damnjanovic et al. |
| 2012/0039330 A1 | 2/2012 | Baldemair et al. |
| 2012/0087266 A1 | 4/2012 | Vajapeyam et al. |
| 2012/0113844 A1 | 5/2012 | Krishnamurthy |
| 2012/0201159 A1 | 8/2012 | Morita et al. |
| 2012/0287886 A1 | 11/2012 | Fukuoka et al. |
| 2012/0315956 A1 | 12/2012 | Mochida et al. |
| 2013/0012259 A1* | 1/2013 | Furuskar ............ H04W 52/244 455/522 |
| 2013/0040683 A1 | 2/2013 | Siomina et al. |
| 2013/0109384 A1 | 5/2013 | Abe et al. |
| 2013/0114447 A1 | 5/2013 | Luo et al. |
| 2013/0114451 A1 | 5/2013 | Al-Dhahir et al. |
| 2013/0136074 A1 | 5/2013 | Okino |
| 2013/0142138 A1 | 6/2013 | Dinan |
| 2013/0142175 A1 | 6/2013 | Manssour et al. |
| 2013/0148620 A1 | 6/2013 | Nanri et al. |
| 2013/0165134 A1 | 6/2013 | Touag et al. |
| 2013/0182655 A1 | 7/2013 | Das et al. |
| 2013/0188624 A1 | 7/2013 | Lee |
| 2013/0225192 A1* | 8/2013 | Yamamoto ............ H04W 16/16 455/452.1 |
| 2013/0265961 A1 | 10/2013 | Van Phan et al. |
| 2013/0279355 A1 | 10/2013 | Sadek et al. |
| 2013/0286952 A1 | 10/2013 | Ghosh et al. |
| 2013/0301468 A1 | 11/2013 | Lee et al. |
| 2013/0336178 A1 | 12/2013 | Tiirola et al. |
| 2013/0343241 A1 | 12/2013 | Niu et al. |
| 2014/0056275 A1* | 2/2014 | Behnamfar ......... H04W 72/085 370/330 |
| 2014/0079009 A1 | 3/2014 | Liu et al. |
| 2014/0133415 A1 | 5/2014 | Damnjanovic et al. |
| 2014/0161060 A1 | 6/2014 | Nam et al. |
| 2014/0162661 A1* | 6/2014 | Shaw ................... H04W 36/22 455/439 |
| 2014/0192759 A1* | 7/2014 | Son ................... H04W 72/0426 370/329 |
| 2014/0204765 A1 | 7/2014 | Chai et al. |
| 2014/0206341 A1 | 7/2014 | Siomina et al. |
| 2014/0211671 A1* | 7/2014 | Choi ..................... H04J 3/1694 370/280 |
| 2014/0226481 A1 | 8/2014 | Dahod et al. |
| 2014/0286283 A1* | 9/2014 | Kim .................... H04W 52/243 370/329 |
| 2014/0308953 A1* | 10/2014 | Park ..................... H04W 76/16 455/436 |
| 2015/0056931 A1 | 2/2015 | Yerramalli et al. |
| 2015/0063295 A1 | 3/2015 | Himayat et al. |
| 2015/0065135 A1 | 3/2015 | Claussen et al. |
| 2015/0071201 A1 | 3/2015 | Larsson et al. |
| 2015/0092552 A1 | 4/2015 | Bajj et al. |
| 2015/0173069 A1* | 6/2015 | Cucala Garcia .. H04W 72/1289 370/329 |
| 2015/0195066 A1 | 7/2015 | Singh et al. |
| 2015/0264652 A1* | 9/2015 | Zhang ................. H04W 52/143 455/522 |
| 2015/0296490 A1 | 10/2015 | Yi et al. |
| 2015/0373731 A1* | 12/2015 | Quan ..................... H04W 16/10 370/329 |
| 2016/0119071 A1 | 4/2016 | Sagong et al. |
| 2016/0119941 A1* | 4/2016 | Ko ........................ H04W 52/04 455/453 |
| 2016/0165500 A1 | 6/2016 | Hasegawa |
| 2016/0173152 A1 | 6/2016 | Rahman et al. |
| 2016/0262114 A1 | 9/2016 | Chen et al. |
| 2016/0286425 A1 | 9/2016 | Gormley et al. |
| 2016/0323787 A1 | 11/2016 | Nanri et al. |
| 2016/0323788 A1 | 11/2016 | Nanri et al. |
| 2016/0337916 A1 | 11/2016 | Deenoo et al. |

FOREIGN PATENT DOCUMENTS

| | | |
|---|---|---|
| WO | 2013048582 A1 | 4/2013 |
| WO | 2016083524 A1 | 6/2016 |

OTHER PUBLICATIONS

European Telecommunications Standards Institute, ETSI TS 136 331 v8.21.0 (Jul. 2014), "LTE; Evolved Universal Terrestrial Radio Access (E-UTRA); Radio Resource Control (RRC); Protocol Specification (3GPP TS 36.331 version 8.21.0 Release 8)," Jul. 2014 V8.21.0.

European Telecommunications Standards Institute, ETSI TS 136 314 v9.1.0 (Jul. 2010), "LTE; Evolved Universal Terrestrial Radio Access Network (E-UTRAN); Layer 2—Measurements (3GPP TS 36.314 version 9.1.0 Release 9)," Jul. 2010, V9.1.0.

European Telecommunications Standards Institute, ETSI TS 136 214 v10.1.0 (Apr. 2011), "LTE; Evolved Universal Terrestrial Radio Access (E-UTRA); Physical Layer; Measurements (3GPP TS 36.214 version 10.1.0 Release 10)," Apr. 2011, V10.1.0.

European Telecommunications Standards Institute, ETSI TS 123 203 v10.4.0 (Jun. 2011), "Digital Cellular Telecommunications System (Phase 2+); Universal Mobile Telecommunications Systems (UMTS); LTE; Policy and Charging Control Architecture (3GPP TS 23.203 version 10.4.0 Release 10)," Jun. 2011, V10.4.0.

3rd Generation Partnership Project, 3GPP TR 37.803 v11.1.0 (Dec. 2012), "3rd Generation Partnership Project; Technical Specification Group Radio Access Network; Universal Mobile Telecommunications System (UMTS) and LTE; Mobility Enhancements for Home Node B (HNB) and Home Enhanced Node B (HeNB) (Release 11)," 3rd Generation Partnership Project, Dec. 2012, V11.1.0.

European Telecommunications Standards Institute, ETSI TS 136 423 v10.1.0 (Apr. 2011), "LTE; Evolved Universal Terrestrial Radio Access Network (E-UTRAN); X2 Application Protocol (X2AP) (3GPP TS 36.423 version 10.1.0 Release 10)," Apr. 2011, V10.1.0.

European Telecommunications Standards Institute, ETSI TS 136 300 v8.9.0 (Jul. 2009), "LTE; Evolved Universal Terrestrial Radio Access (E-UTRA); and Evolved Universal Terrestrial Radio Access Network (E-UTRAN); Overall Description; Stage 2 (3GPP TS 36.300 version 8.9.0 Release 8)," Jul. 2009, V8.9.0.

3rd Generation Partnership Project, "Overview of 3GPP Release 10 V0.2.1 (Release 10)," Jun. 2014, V0.2.1.

3rd Generation Partnership Project, 3GPP TS 36.300 v8.3.0 (Dec. 2007), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3rd Generation Partnership Project, Dec. 2007, V8.3.0.

* cited by examiner

INTER-CELL INTERFERENCE MITIGATION

CROSS-REFERENCE TO RELATED APPLICATIONS

This application claims the benefit of priority under 35 U.S.C. § 119(e) of U.S. Provisional Patent Application Nos. 62/037,982, filed Aug. 15, 2014, and entitled "Inter-Cell Interference Mitigation," which is hereby incorporated by reference in its entirety for all purposes. Additionally, U.S. Pat. App. Pub. Nos. US20140086120, US20140092765, US20140133456, US20150045063, and US20150078167 are hereby incorporated by reference in their entirety for all purposes.

TECHNICAL FIELD

This disclosure relates to wireless base stations and mesh networks. More specifically, this disclosure relates to reducing inter-cell interference at a base station.

BACKGROUND

In deployment of cellular radio networks, a base station is needed to be placed for each region that requires coverage. Prior deployment strategies assumed a regular cell topology, resulting in the emplacement of radio base stations according to a strict geometric pattern. However, in real-world deployments, identically-sized cells are ill-suited to providing effective coverage because of topological features (i.e., mountains, hills, highways, etc.), and because of varying population density patterns, among other reasons.

To handle these varying characteristics, strategies involving multiple cell sizes have been proposed. For example, a traditional macro cell base station may be used to cover a relatively large area, but may be supplemented in an area of increased population density by a micro-cell (covering a smaller area than a macro-cell), a femto-cell (covering a smaller area than a micro-cell, such as a single building), or a mobile base station.

However, integration of these base stations of various sizes causes interference between cells. This is particularly true because micro-cells and other smaller cells are often placed in a location that overlaps substantially or completely with the coverage area of a macro cell. The micro cell base station and the macro cell base station may end up competing for radio resources and reducing the effectiveness of attached mobile nodes via inter-cell interference. Techniques are needed to cancel this interference and to enable multiple cells to coexist and provide enhanced service.

SUMMARY

To address the problem of inter-cell interference in a heterogeneous network, several methods and systems are disclosed for determining interference caused by an aggressor mobile node, and transmitting at appropriate times and with transmit power that does not cause interference. Methods disclosed include using X2 communications, such as HII and RNTP messages, switching to an alternative radio access technology, sniffing at the eNodeB to obtain information, coordinating with a cloud coordination server, and using CFI information to avoid interfering with communications on the PDCCH.

DETAILED DESCRIPTION

Four scenarios for interference mitigation, for mitigating four types of interference, are described. Each of the four scenarios may occur at the same time, or may occur separately. For purposes of the below disclosure, a macro cell base station may be provided that does not perform interference mitigation, and a mobile eNodeB may be provided that is enhanced with the mitigation techniques and methods described herein. A user equipment (UE) that causes interference may be called an aggressor, and a UE that is subject to interference may be called a victim, in some aspects of the below disclosure.

Figure 1:
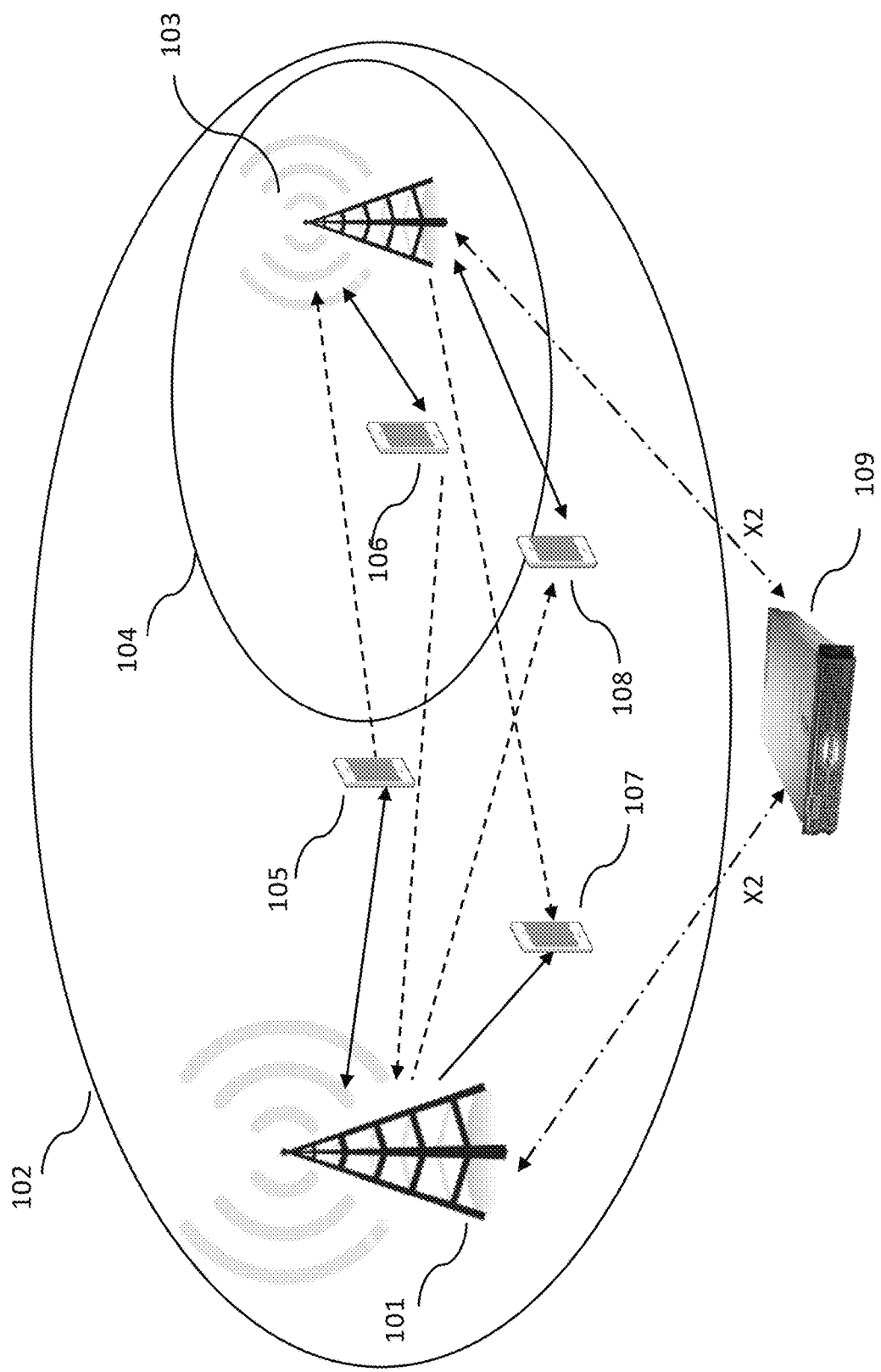
FIG. 1 illustrates a schematic diagram of four interference scenarios.

FIG. 1 illustrates a schematic diagram of four interference scenarios. Macro eNodeB 101 has coverage area 102, and micro eNodeB 103 has coverage area 104. UEs 105, 106, 107, 108 are located in coverage area 102. UEs 106 and 108 are additionally located in coverage area 104. Coordinating node 109 is in communication with eNodeBs 101 and 103 via the X2 protocol, represented by a dot-dashed line. Each of the UEs illustrates a different interference scenario. Desired signals are shown as solid lines and interfering signals are shown as dotted lines.

In a first scenario, UE 105 is attached to (associated with) a macro eNodeB and transmits data to the macro eNodeB, which generates interference on the uplink band for UEs attached to a nearby micro eNodeB. In a second scenario, UE 106 is attached to a micro cell eNodeB and transmits data to the micro cell eNodeB, which generates interference on the uplink band for UEs attached to a nearby macro cell eNodeB. In a third scenario, UE 107 is attached to a macro cell eNodeB and receives data from the macro cell eNodeB, which generates interference on the downlink band for UEs attached to a nearby micro cell eNodeB. In a fourth scenario, UE 108 is attached to a micro cell eNodeB and receives data from the micro cell eNodeB, which generates interference on the downlink band for UEs attached to a nearby macro cell eNodeB.

Turning to the first scenario, a UE is attached to (associated with) a macro eNodeB and transmits data to the macro eNodeB, which generates interference on the uplink band for UEs attached to a nearby micro eNodeB.

In one embodiment, an X2 protocol-based coordination scheme may be used to preventively address the uplink interference. Various messages may be used by an eNodeB to share interference information with other eNodeBs, including relative narrowband transmit power indicator (RNTP) messages for downlink channels and high interference indicator (HII) messages for uplink channels. An HII message is a bitmap that indicates, with one bit per physical resource block (PRB) in the uplink, indicating that eNodeBs in the neighborhood should expect a high-interference power event in the near future.

In the case that a micro cell eNodeB receives an HII message from the macro cell, the micro cell eNodeB may avoid using the uplink physical resource related to the identified PRB in the next time window, which may be a transport time interval (TTI).

In one embodiment, the macro cell eNodeB can identify potential interfering UEs by using UE measurements, such as based on signal measurements sent by the UE as scheduled UE measurement reports. The macro cell eNodeB may, after identifying interfering UEs, send a HII message to neighboring eNodeBs via the X2 protocol.

In another embodiment, a coordinated reactive solution is provided in which a micro cell eNodeB performs a sniffing procedure across all uplink frequency resources. The micro cell eNodeB thereby identifies suitable resources for uplink scheduling for communicating with its own UEs. No X2 coordination is required in this case.

In another embodiment, in which sniffing is used by the micro cell, X2 coordination may be used by the micro cell, which may send an overload indicator (OI) via X2 to the macro cell eNodeB when high uplink interference is sensed from the UE attached to the macro cell. The OI message may request that the macro cell base station either reduce the power or re-schedule the interfering UE's uplink resource.

Sniffing may be used to assess available uplink resources. The sniffing base station may listen on a plurality of radio frequencies to determine how each radio resource is used. For each radio resource, the sniffing base station may receive signals broadcast on that resource, and may then calculate power spectral density for each band. The calculation of power spectral density may be over a short time period, such as over 1 TTI, or less than 1 TTI. The calculation of power spectral density may be performed at a digital signal processor (DSP). In other embodiments, sniffing may be used to assess available downlink resources.

In another embodiment, a micro cell eNodeB may check whether the affected UEs can be switched to a different radio access technology (RAT), such as Wi-Fi. As Wi-Fi has different characteristics, the check may include determining whether the desired spectral band is available, and may also include determining whether the UE is within Wi-Fi range, which may be less than the range of the LTE protocol air interface. A soft handoff may be performed between the LTE and Wi-Fi interfaces. Wi-Fi may be used as a last resort in the case that interference is above a maximum permitted threshold. Wi-Fi may also be used in the case that other interference mitigation attempts are not successful. A switch to Wi-Fi may be performed in connection with each of the below scenarios as well, in some embodiments.

In a second scenario, a UE is attached to a micro cell eNodeB and transmits data to the micro cell eNodeB, which generates interference on the uplink band for UEs attached to a nearby macro cell eNodeB. In this scenario, different options are available to the micro cell eNodeB.

The micro cell eNodeB may be receiving radio signal measurement reports from the attached UE. Based on these UE measurements, and optionally on system information blocks (SIBs) received from the macro eNodeB, the micro cell eNodeB may compute path loss to the macro cell eNodeB from each UE served by the micro cell eNodeB.

Based on the computed path loss, the micro eNodeB may configure each UE's maximum uplink transmit power to ensure that the ratio of interference power to noise does not exceed a specified threshold.

In some embodiments, the UE's maximum uplink transmit power may be based on either the estimated range of the micro cell eNodeB or the estimated range of the macro cell eNodeB, or both.

As in the prior scenario, the micro cell eNodeB may also check whether each aggressor UE may be switched to a different RAT, such as Wi-Fi, in some embodiments.

In a third scenario, a UE is attached to a macro cell eNodeB and receives data from the macro cell eNodeB, which generates interference on the downlink band for UEs attached to a nearby micro cell eNodeB.

In one embodiment, a micro cell eNodeB may take into account RNTP messages sent from the macro cell. Similar to HII messages but for downlink channels, RNTP messages are messages sent according to the X2 protocol that include a bitmap indicating, with one bit per physical resource block (PRB) in the downlink, indicating that eNodeBs in the neighborhood should expect a high-interference power event in the near future. The micro cell eNodeB may use received RNTP messages to schedule use of downlink radio resources.

The micro cell eNodeB may also use UE measurements of nearby interference, such as those included with UE measurement reports, in some embodiments. Using UE-specific measurement reports may permit micro cell eNodeBs to decide which PRBs to avoid for specific UEs.

In some embodiments, the transmit power for each UE may be dynamically adjusted based on one or more parameters, such as measured interference, signal strength of other base station nodes, or other parameters. Transmit power may be adjusted based on signals received at more than one eNodeB, including micro cell eNodeBs and macro cell eNodeBs, in some embodiments. Transmit power may be adjusted based on communications with a cloud coordination server, which may coordinate interference and signal strength reports from multiple eNodeBs, in some embodiments.

One particular type of interference that requires special treatment on the downlink is control channel interference. While HII and RNTP messages allow a base station to avoid control channel interference on the uplink by transmitting during periods when there is less interference, the downlink control channel, otherwise known as the physical downlink control channel (PDCCH), is active during each TTI for each UE at a fixed time, designated to be the first 1 or 2 or 3 (or 4, under special circumstances) OFDM symbols at the beginning of each subframe. Since interference during transmission of the control channel may lead to the inability of the UE to receive any data during a given TTI, it is important to reduce interference particularly during transmission of the PDCCH.

The PDCCH appears within the first 4 OFDM symbols of each subframe, each symbol including 12 subcarriers, so that there are 48 resource elements that may be used by an eNodeB to transmit PDCCH data. In some embodiments, the micro cell base station is enabled to avoid PDCCH interference between the macro cell base station and the macro cell-attached UE by changing the PDCCH symbol location and/or modulation and control scheme (MCS) for each UE attached to the micro cell eNodeB to use non-interfering resource elements, as described below.

In some embodiments, control format indicator (CFI) information of the macro cell may be used to mitigate interference. Typically, the control channel of an LTE downlink connection is synchronized with the base station and scheduled for a particular time within the TTI, with the most important information being sent at the beginning of a subframe sent at the particular time. The CFI is a parameter that indicates, on the control channel for the downlink, what time span to use for a particular downlink subframe. The time span is indicated in symbols, according to an orthogonal frequency division multiplexing (OFDM) encoding scheme. A single resource block consists of 72 resource elements, divided into 12 subcarriers and 6 symbols, in some embodiments. The CFI may have a value of 1, 2, or 3, according to some versions of the LTE standard, and indicates which of the first three symbol columns in each subframe is used to contain the PDCCH. CFI is transmitted on the downlink to a UE on the physical control format indicator channel (PCFICH), and is subject to channel coding along that channel.

Figure 2:
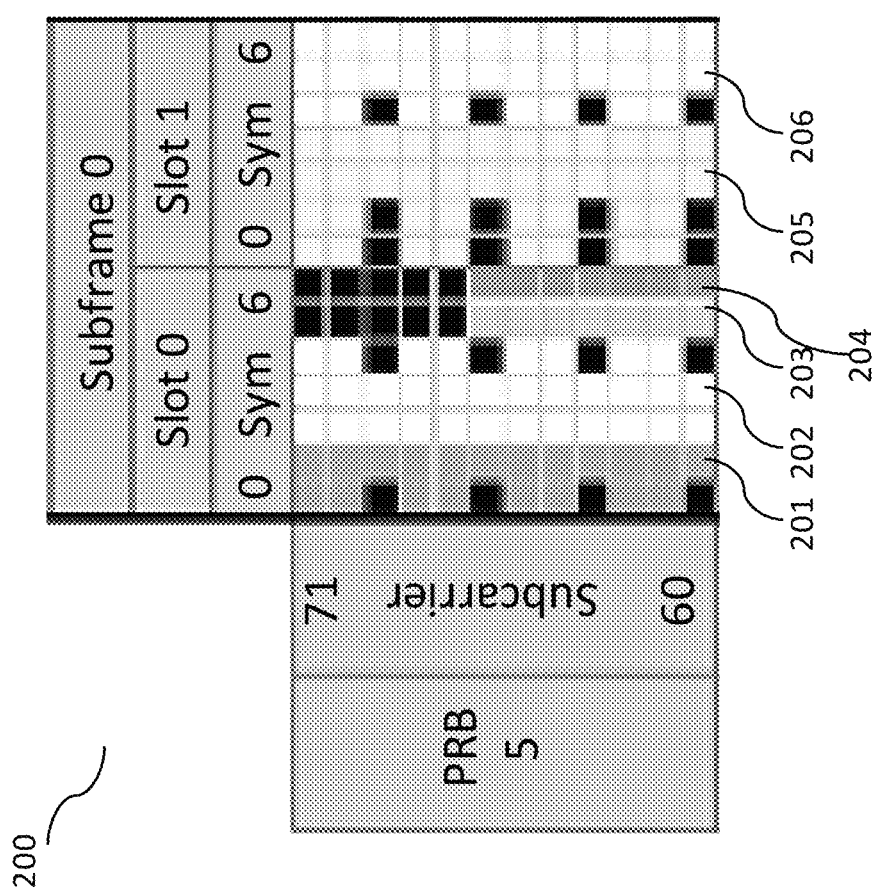
FIG. 2 depicts an example usage pattern of a subframe.

FIG. 2 depicts an example usage pattern of a subframe, for reference. Diagram 200 depicts a part of a radio frame. The radio frame has several subframes, of which subframe 0 is shown, and each subframe has multiple physical resource blocks (PRBs), of which PRB 5 is shown. Each PRB has multiple subcarriers; here, subcarriers 60-71 are shown. Each subframe also has two slots, 0 and 1, and each slot has 7 symbols, 0-6. At 201, the first two symbols of slot 0, excepting subcarriers 60, 63, 66 and 69 for symbol 0, are the physical downlink control channel (PDCCH). At 202, three symbols are available for a physical downlink shared channel (PDSCH). At 203, a subset of one symbol is available for a secondary synchronization channel (SSCH). At 204, a subset of one symbol is available for a primary synchronization channel (PSCH). At 205, a subset of four symbols are available for a physical broadcast channel (PBCH). At 206, a subset of three symbols are available for PDSCH.

For a CFI received from a macro cell eNodeB, when the CFI is 1, the first symbol of a given subframe is occupied by the PDCCH. When the CFI is 2 or higher, the first n symbols of the given subframe are occupied by the PDCCH. With this information, the micro cell eNodeB may assign resource elements that are not occupied by the macro cell eNodeB's PDCCH. This assignment may be done by identifying the specific resource elements occupied by the macro cell eNodeB's PDCCH.

Assignment of resource elements may also be done by taking into account which symbols of the subframe are occupied by the macro cell eNodeB's PDCCH. If the CFI is 1, and only a single symbol is being used, the micro cell eNodeB is free to use the second symbol as well as any subsequent symbol for sending its own PDCCH information. In cases where the macro cell eNodeB's CFI is 1 or 2, micro cell eNodeB may set the CFI of an attached UE to {1+the CFI of the macro cell eNodeB}, taking care only to not use symbols that are in use by the macro cell eNodeB. In cases where the macro cell eNodeB's CFI is 3 or 4, one of the other approaches discussed below may be used.

In addition to being transmitted from the macro cell to the UE, CFI information may be present in the RNTP received from the macro cell eNodeB by the micro cell eNodeB and carried via X2, and may be used on that basis, in some embodiments. Alternatively, the CFI may be learned via real-time sniffing by the micro cell eNodeB.

Next, the PDCCH control channel element (CCE) aggregation level may also be increased to reduce PDCCH interference from the macro cell eNodeB, based on the downlink signal strength of the macro cell. The signal strength may have been received directly from the macro cell base station, measured by a UE and sent via measurement report from the UE to the micro cell base station, or reported from the UE based on an RSRP message from the macro cell base station, or measured by an RF sniffer present in the micro cell base station, as described above, in some embodiments.

In some embodiments, the CCE aggregation level may be increased at the micro cell eNodeB to use more aggregated resource elements at the beginning of a subframe in a TTI. The CCE aggregation level is the number of consecutive resource element groups (REGs) used for sending the downlink control information for a particular TTI, and may take values 1, 2, 4, and 8, or other values, in some versions of the LTE standard. The CCE aggregation level is multiplied by the number of resource elements in a resource element group, 4, to obtain the total number of resource elements that are being claimed. However, not all claimed resource elements must be used.

In some embodiments, in the case that the CCE aggregation level for a UE connected to a macro cell eNodeB is known by the micro cell eNodeB, the micro cell eNodeB may use a method in which the micro cell eNodeB uses the CCE aggregation level to identify specific resource entities that are being used by the macro cell eNodeB for a given UE's DCI, and the micro cell eNodeB may then send its own DCI to each of its UEs without using the identified resource entities, which are known to be interfering.

In some embodiments, the CCE aggregation level may be increased in conjunction with increasing the code rate of the control channel. This causes the introduction of greater redundancy into the transmission of a PDCCH DCI message to a given UE, which allows the micro cell eNodeB to use a lower transmit power, thus causing less interference to the macro cell eNodeB and its PDCCH.

In some embodiments, either a plurality of eNodeBs in communication with one another, or a central coordination server may be used to plan what PCI to use for each UE. The plan may be based on sniffing and/or UE measurements to avoid PCFICH interference, as described above.

In some embodiments, a micro cell eNodeB may use a sub-band channel quality indication (CQI) report received from a UE to schedule a downlink PRB so as to not use the channels identified as being of poor quality. In addition, the CQI report may be used as feedback for adjusting the transmit power of the micro cell eNodeB. In addition, the CQI report may be used as feedback for adjusting the modulation and coding scheme (MCS) of the attached UE.

In some embodiments, as described above, the micro cell eNodeB may check whether the victim UE can be switched to different RAT, such as Wi-Fi.

In a fourth scenario, a UE is attached to a micro cell eNodeB and receives data from the micro cell eNodeB, which generates interference on the downlink band for UEs attached to a nearby macro cell eNodeB. The method for handling interference in this case is similar to that given for the third scenario, with the following differences. As the micro cell eNodeB has the option of generating and sending an RNTP message, the micro cell eNodeB may send such a message to the macro cell eNodeB, in some embodiments. As well, the micro cell eNodeB may not use a sub-band CQI, in some embodiments. In some embodiments, the micro cell eNodeB may not receive UE measurement reports, but instead may perform sniffing and/or out-of-band querying to obtain signal strength information for neighboring base stations. In some embodiments, the aggressor mobile node and the victim mobile node may be associated with two eNodeBs that are each in communication with a cloud coordination server, and the signal strength information for neighboring base stations may be shared among both eNodeBs via the cloud coordination server. In some embodiments, the micro cell eNodeB may determine, based on measurement reports from its own attached UEs, that each of its UEs are well-covered, and may reduce transmit power, further mitigating interference.

Figure 3:
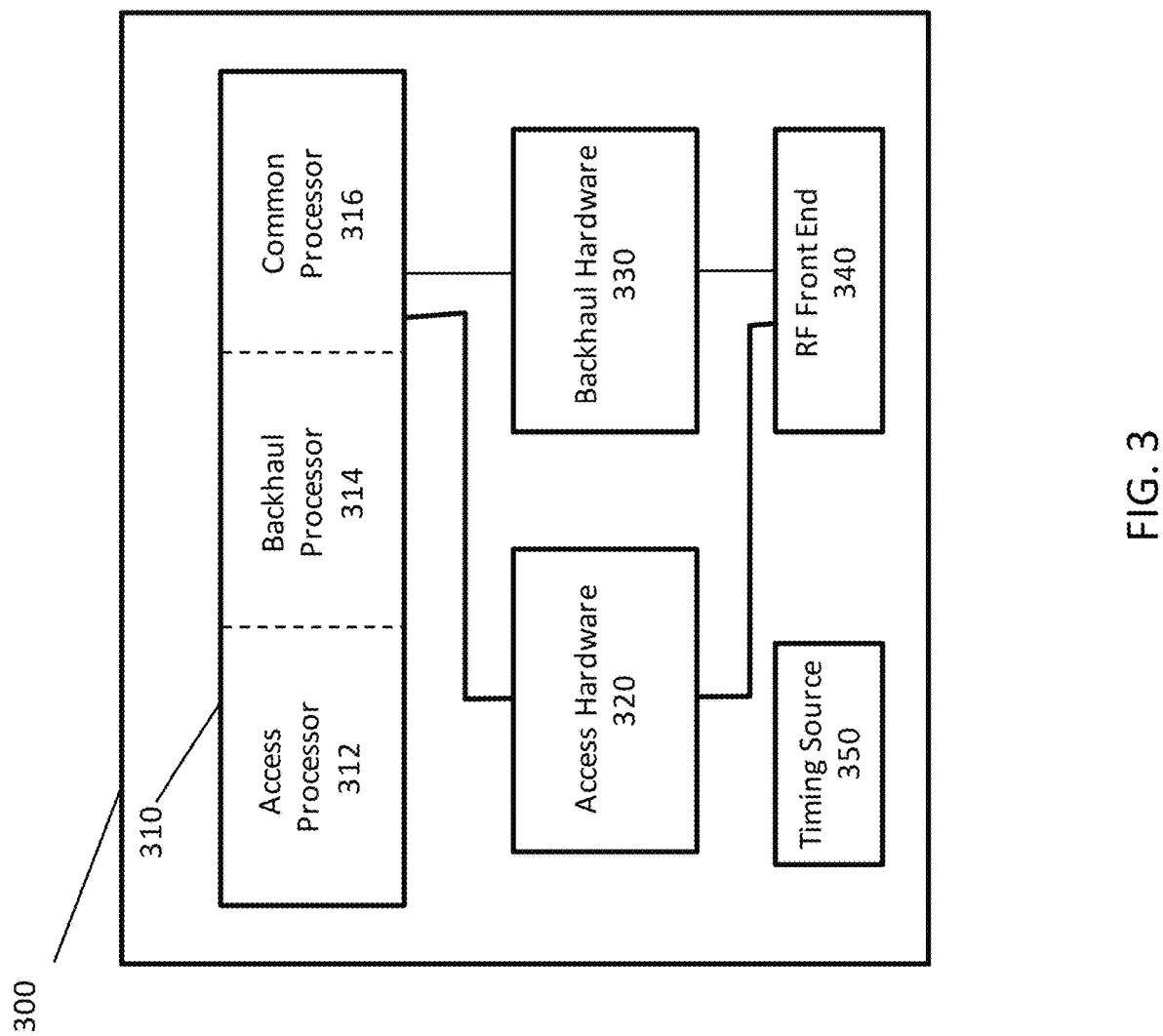
FIG. 3 is a block diagram of hardware and/or software used in some embodiments.

FIG. 3 is a block diagram of hardware and/or software used in some embodiments. In one embodiment, a multi-RAT node 300 is comprised of at least one processor 310, access hardware 320, backhaul hardware 330, an RF front-end 340, and a timing source 350. By way of example, the at least one processor 310 could contain firmware written in Linux. Additionally, the RF front-end 340 can be configured to provide RF capabilities for multiple radio access technologies.

In one embodiment, the timing source could be GPS. Alternatively, the timing source could be derived from the Ethernet, or an IEEE 3588 source, such as SyncE, PTP/1588v2, and the like. In an alternate embodiment, wherein one multi-RAT node 300 may have access to GPS time, but another multi-RAT node 300 may be indoors, the two multi-RAT nodes 300 could use differential time synching techniques well known to those of skill in the art so that the indoor multi-RAT node 300 could sync its timing with that of the outdoor multi-RAT node 300. In another embodiment, the multi-RAT node 300 could be a dynamic multi-RAT node.

In alternate embodiments, the at least one processor 310, could be broken down into an access processor 312, a backhaul processor 314, a common processor 316, or any combination thereof. In this embodiment, the access hardware 320 is coupled to the at least one processor 310. In an alternate embodiment, having a separate access processor 312, the access hardware 320 could be coupled to the access processor 312, to the at least one processor 310, or to the common processor 316, or any combination thereof. Similarly, in another alternate embodiment, having a separate backhaul processor 314, the backhaul hardware 330 could be coupled to the backhaul processor 314, to the common processor 310, or to the common processor 316, or any combination thereof.

Those skilled in the art will appreciate that access and backhaul hardware will vary depending on the access or backhaul protocol or frequency being used to perform access or backhaul. By way of example, if a particular multi-RAT node 300 was designed to permit access on LTE and Wi-Fi, it could have the radio access technology components that would perform access on these two different protocols. For LTE access, the access hardware 320 could be comprised of: a baseband processor and one or more CPU cores for the firmware. The baseband processor could generate digital RF signals, which are modulated by the RF front end 340. These processors could be connected to the RF front end 340 via radio interfaces. Alternatively, some or all of the necessary radio access technology may incorporate commercial off-the-shelf (COTS) hardware/firmware devices, such as conventional Wi-Fi access hardware based on Atheros chips with embedded firmware and one or more external antennas.

Those skilled in the art will recognize that multiple hardware and software configurations could be used depending upon the access protocol, backhaul protocol, duplexing scheme, or operating frequency band by adding or replacing daughtercards to the dynamic multi-RAT node 300. Presently, there are radio cards that can be used for the varying radio parameters. Accordingly, the multi-RAT nodes 300 of the present invention could be designed to contain as many radio cards as desired given the radio parameters of heterogeneous mesh networks within which the multi-RAT node 300 is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

Although the scenarios for interference mitigation are described in relation to macro cells and micro cells, the same techniques could be used for reducing interference between any two cells, in which only one of the two cells is required to perform the interference mitigation methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the micro cell, the processing may also be performed in coordination with a cloud coordination server. The micro cell eNodeB may be in communication with the cloud coordination server via an X2 protocol connection, or another connection. The micro cell eNodeB may perform inter-cell coordination via the cloud communication server, when other cells are in communication with the cloud coordination server. The micro cell eNodeB may communicate with the cloud coordination server to determine whether the UE has the ability to support a handover to Wi-Fi.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, and in particular LTE Release 9, one of skill in the art would understand that these systems and methods could be adapted for use with other wireless standards or versions thereof.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the out-of-band channel may be implemented over a virtual channel over the public Internet.

The invention claimed is:

1. A method for reducing downlink interference at a first base station, the first base station being a micro cell, comprising:
    obtaining, at a cloud coordination server from the first base station, neighboring radio power information for a second base station via a measurement report message from a mobile device attached to the first base station, the second base station being a macro cell;
    sending a message from the cloud coordination server to assign, at the first base station, a transmit power for the mobile device based on the neighboring radio power information;
    obtaining, at the cloud coordination server from the first base station, a format indicator of a neighboring control channel used by the second base station;
    sending a second message from the cloud coordination to assign the first base station, at least one control channel parameter, the control channel parameter comprising a control channel symbol location, a control channel modulation code scheme, or a control channel aggregation level, for a user channel at the mobile device and based on the neighboring control channel format indicator;
    sending the assigned transmit power and assigning the at least one control channel parameter to the mobile device;
    assigning the control channel symbol location for the downlink channel to avoid symbol locations indicated as being in use in the neighboring control channel; and
    sniffing a Control Format Indicator (CFI) of the macro cell to avoid interfering with a Physical Control Format Indicator Channel (PCFICH).

2. The method of claim 1, further comprising receiving a relative power bitmap from a macro base station, wherein the macro base station is an interfering base station.

3. The method of claim 1, further comprising comparing interference at the mobile device to a predetermined power threshold to assess a handover to a different radio access technology.

4. The method of claim 1, further comprising performing real-time sniffing to determine the format indicator used by the second base station.

5. The method of claim 1, further comprising determining the control format used by the second base station from a received X2 message.

6. The method of claim 1, further comprising receiving a sub-band quality message from the mobile device and assigning the at least one control channel parameter based on the sub-band quality message, for a downlink channel.

7. The method of claim 1, further comprising increasing a degree of coding via adjusting the control channel modulation code scheme, wherein the control channel symbol location used by the second base station includes at least a first three symbols in a control channel sub-frame.

8. The method of claim 1, wherein the first base station, in coordination with the cloud coordination server, determines whether mobile devices connected to the mobile base station may be switched to a Wi-Fi connection.

9. The method of claim 1, wherein the format indicator is a control format indicator (CFI) and the user channel is a physical downlink control channel (PDCCH).

10. A method for reducing downlink interference at a second base station, comprising:
    obtaining, at a cloud coordination server from a first base station, radio power information of the second base station received from a mobile device via a measurement report message;
    sending a message from the cloud coordination server to assign, at the first base station, a transmit power for a mobile device based on the radio power information of the second base station;
    obtaining, at the cloud coordination server from the first base station, a format indicator of a neighboring control channel used by the second base station;
    sending a second message from the cloud coordination server as a base station control plane signaling message to assign, at the first base station, at least one control channel parameter, the control channel parameter comprising a control channel symbol location, a control channel modulation code scheme, or a control channel aggregation level, for a user data channel at the mobile device and based on the neighboring control channel format indicator;
    assigning the control channel symbol location for the downlink channel to avoid symbol locations indicated as being in use in the neighboring control channel;
    sniffing a Control Format Indicator (CFI) of the macro cell to avoid interfering with a Physical Control Format Indicator Channel (PCFICH); and
    reducing the transmit power for the mobile device at the first base station, wherein the first base station is a micro cell and the second base station is a macro cell.

11. The method of claim 1, further comprising increasing a PDCCH control channel element (CCE) aggregation level at the first base station based on the neighboring radio power information, thereby reducing output power of the mobile device, and setting a control format indicator (CFI) at the first base station to the format indicator of the neighboring control channel used by the second base station.

* * * * *